US008401907B2

(12) United States Patent
Litzow et al.

(10) Patent No.: US 8,401,907 B2
(45) Date of Patent: Mar. 19, 2013

(54) SYSTEM AND METHOD FOR DYNAMIC PRICE SETTING AND FACILITATION OF COMMERCIAL TRANSACTIONS

(76) Inventors: Steve Litzow, Mercer Island, WA (US); Rebel Rice, San Francisco, CA (US); William Addington, Houston, TX (US)

( * ) Notice: Subject to any disclaimer, the term of this patent is extended or adjusted under 35 U.S.C. 154(b) by 859 days.

(21) Appl. No.: 12/177,841

(22) Filed: Jul. 22, 2008

(65) Prior Publication Data
US 2009/0049076 A1 Feb. 19, 2009

Related U.S. Application Data

(63) Continuation of application No. 10/935,728, filed on Sep. 7, 2004, now abandoned, which is a continuation of application No. 09/714,853, filed on Nov. 15, 2000.

(60) Provisional application No. 60/180,363, filed on Feb. 4, 2000, provisional application No. 60/203,183, filed on May 8, 2000.

(51) Int. Cl.
*G06Q 30/00* (2012.01)
(52) U.S. Cl. .................. 705/26.1; 705/40; 707/752
(58) Field of Classification Search ............. 707/752, 707/731; 705/40, 26.1, 26.8
See application file for complete search history.

(56) References Cited

U.S. PATENT DOCUMENTS

| 5,646,992 | A | | 7/1997 | Subler et al. |
| 5,774,868 | A | | 6/1998 | Cragun et al. |
| 5,794,207 | A | | 8/1998 | Walker et al. |
| 5,806,043 | A | * | 9/1998 | Toader ........................ 405/14 |
| 5,842,185 | A | * | 11/1998 | Chancey et al. ................. 705/40 |
| 5,852,812 | A | | 12/1998 | Reeder |
| 5,918,213 | A | * | 6/1999 | Bernard et al. ............. 705/26.35 |
| 5,940,821 | A | * | 8/1999 | Wical .................................... 1/1 |
| 5,945,653 | A | * | 8/1999 | Walker et al. ................. 235/380 |
| 5,950,175 | A | * | 9/1999 | Austin ........................ 705/36 R |
| 5,974,396 | A | | 10/1999 | Anderson et al. |
| 5,991,735 | A | * | 11/1999 | Gerace ......................... 705/7.33 |
| 5,999,919 | A | * | 12/1999 | Jarecki et al. ................... 705/40 |
| 6,064,982 | A | | 5/2000 | Puri |
| 6,073,112 | A | | 6/2000 | Geerlings |
| 6,078,892 | A | | 6/2000 | Anderson et al. |
| 6,125,349 | A | | 9/2000 | Maher |
| 6,236,977 | B1 | | 5/2001 | Verba et al. |
| 6,266,649 | B1 | | 7/2001 | Linden et al. |
| 6,298,330 | B1 | | 10/2001 | Gardenswartz et al. |
| 6,298,348 | B1 | | 10/2001 | Eldering |
| 6,304,854 | B1 | | 10/2001 | Harris |
| 6,313,745 | B1 | | 11/2001 | Suzuki |
| 6,341,353 | B1 | | 1/2002 | Herman et al. |

(Continued)

FOREIGN PATENT DOCUMENTS

WO WO9828906 A2 7/1998

OTHER PUBLICATIONS

Fortanet, Inmaculada et al.: "Netvertising: content-based subgeneric variations in a digital genre", IEEE, 1998.

*Primary Examiner* — Cam Truong
(74) *Attorney, Agent, or Firm* — Foster Pepper PLLC; Richard T. Black; P. G. Scott Born

(57) ABSTRACT

The present invention provides methods and systems for defining commercial transaction components; defining rules for mapping customer transactions into individual components; market segmentation in light of these individual definitions and bundling individual components of an offer into optimized packages for presentation and sale. A data processing system in accordance with one embodiment of the present invention, examines the commercial behavior of enrolled customers, breaks each of the constituent transactions into purchases of atom-level components; catalogues those components; extracts demographic information from said transactions and other sources; facilitates demographic studies of groups of such customers; optimizes offerings to such groups; and facilitates the consummation of those offers of sale. The processing system may also facilitate customers fiscal management through the communication of data necessary to practice the instant invention.

3 Claims, 12 Drawing Sheets

U.S. PATENT DOCUMENTS

| | | |
|---|---|---|
| 6,477,508 B1 | 11/2002 | Lazar et al. |
| 6,477,509 B1 | 11/2002 | Hammons et al. |
| 6,584,451 B1 | 6/2003 | Shoham et al. |
| 6,606,744 B1 | 8/2003 | Mikurak |
| 6,631,356 B1 | 10/2003 | Van Horn et al. |
| 6,785,592 B1 | 8/2004 | Smith et al. |
| 7,664,705 B2* | 2/2010 | Walker et al. ............ 705/45 |
| 2001/0014868 A1 | 8/2001 | Herz et al. |
| 2002/0026394 A1 | 2/2002 | Savage et al. |
| 2002/0035506 A1* | 3/2002 | Loya ............ 705/14 |
| 2002/0052774 A1* | 5/2002 | Parker et al. ............ 705/10 |
| 2002/0065717 A1 | 5/2002 | Miller et al. |
| 2002/0111907 A1* | 8/2002 | Ling ............ 705/41 |
| 2002/0116348 A1 | 8/2002 | Phillips et al. |
| 2003/0126095 A1* | 7/2003 | Allen ............ 705/80 |
| 2003/0177072 A1* | 9/2003 | Bared ............ 705/26 |
| 2003/0229533 A1* | 12/2003 | Mack et al. ............ 705/10 |
| 2004/0138953 A1* | 7/2004 | Van Luchene et al. ......... 705/16 |
| 2004/0138962 A1 | 7/2004 | Kopelman et al. |
| 2005/0289000 A1* | 12/2005 | Chiang et al. ............ 705/14 |
| 2006/0178918 A1* | 8/2006 | Mikurak ............ 705/7 |
| 2007/0078869 A1* | 4/2007 | Carr et al. ............ 707/100 |
| 2008/0052191 A1* | 2/2008 | Walker et al. ............ 705/26 |

* cited by examiner

Customer Enrollment and the On-Going Refinement of Customer Database

350

| Payment on Checking Account | | Period – May 01, 2000 to May 31, 2000 | |
|---|---|---|---|
| Date | Payee | Account | Amount |
| 01 May '00 | TCI Television | 2928347 | $37.50 ◄─ 351 |
| 01 May '00 | Puget Sound Energy | 987423948 | $97.19 ◄─ 352 |
| 01-May-'00 | DirecTV | 834723 | $51.50 ◄─ 353 |
| 15 May '00 | Discover Card | 38472734 | $250.00 ◄─ 354 |
| 15 May '00 | State Farm | 928374 | $191.00 ◄─ 355 |
| 15 May '00 | AT&T Long Distance | 206-555-1234 | $71.08 ◄─ 356 |
| 15 May '00 | US West | 206-555-1234 | $39.21 ◄─ 357 |

360

| Payment on Checking Account | | Period – June 01, 2000 to June 30, 2000 | |
|---|---|---|---|
| Date | Payee | Account | Amount |
| 01 June '00 | TCI Television | 2928347 | $37.50 ◄─ 361 |
| 01 June '00 | Puget Sound Energy | 987423948 | $65.00 ◄─ 362 |
| 01-June-'00 | DirecTV | 834723 | $51.50 ◄─ 363 |
| 15 June '00 | Discover Card | 38472734 | $250.00 ◄─ 364 |
| 15 June '00 | State Farm | 928374 | $191.00 ◄─ 365 |
| 15 June '00 | AT&T Long Distance | 206-555-1234 | $102.57 ◄─ 366 |
| 15 June '00 | US West | 206-555-1234 | $42.00 ◄─ 367 |

| Long Distance Calls 808-555-1111 | | | Period – May 01, 2000 to May 31, 2000 | | | |
|---|---|---|---|---|---|---|
| Date | Time of Call | Number Called | Duration | Rate | Cost | |
| 01 May '00 | 02:05 AM | 213-555-1111 | :03 | 0.08 | $0.24 | ← 356.10 |
| 01 May '00 | 02:10 AM | 509-555-1111 | :11 | 0.08 | $0.88 | |
| 03 May '00 | 08:30 AM | 206-555-1111 | :25 | 0.03 | $0.75 | ← 356.20 |
| 03 May '00 | 02:01 AM | 509-555-1111 | :05 | 0.08 | $0.40 | |
| 04 May '00 | 06:08 AM | 509-555-1111 | :59 | 0.08 | $4.72 | |
| 07 May '00 | 07:55 PM | 212-555-1111 | :27 | 0.08 | $2.16 | |
| 07 May '00 | 08:00 PM | 212-555-1111 | :05 | 0.06 | $0.30 | ← 356.30 |
| 15 May '00 | 08:15 PM | 509-555-1111 | :12 | 0.06 | $0.72 | |
| 17 May '00 | 08:31 PM | 509-555-1111 | :27 | 0.06 | $1.62 | |
| 21 May '00 | 08:00 AM | 360-555-1111 | :12 | 0.08 | $0.96 | |
| 21 June '00 | 08:29 AM | 213-555-1111 | :15 | 0.08 | $1.20 | |
| | | Total | | | $13.95 | |

| International Long Distance Calls 808-555-1111 | | | | Period – May 01, 2000 to May 31, 2000 | | | |
|---|---|---|---|---|---|---|---|
| Date | Time of Call | Country | Number Called | Duration | Rate | Cost | |
| 05 May '00 | 09:05 PM | UK | | :25 | 0.45 | $11.25 | ← 356.40 |
| 19 May '00 | 09:07 PM | UK | | :27 | 0.45 | $12.15 | |
| 22 May '00 | 09:09 PM | France | | :02 | 0.55 | $1.10 | ← 356.50 |
| | | Total | | :54 | | $20.27 | |

| Non-Service Charges | Period – June 01, 2000 to June 30, 2000 | |
|---|---|---|
| | Nature of Charge | Amount |
| | City Taxes | $5.12 ← 356.60 |
| | 911 | $1.50 ← 356.70 |
| | State Taxes | 12.12 |
| | Federal Taxes | $7.57 |
| | Total Non-Service | $26.31 ← 356.80 |
| | 206-555-1234 | $60.53 |

Figure 6

Customer Seeking to Purchase

Interactive Product Offering Design

SYSTEM AND METHOD FOR DYNAMIC PRICE SETTING AND FACILITATION OF COMMERCIAL TRANSACTIONS

This application is a continuation of U.S. patent application Ser. No. 10/935,728 filed Sept. 7, 2004 now abandoned; which is a continuation of U.S. patent application Ser. No. 09/714,853 filed Nov. 15, 2000, which claims priority to U.S. Provisional Patent Application Ser. Nos. 60/180,363 filed Feb. 4, 2000 and 60/203,183 filed May 8, 2000, all of which are incorporated herein by reference.

FIELD OF THE INVENTION

This invention relates generally to a method and system for more efficiently matching desired goods and services and offer terms for those goods and services to willing consumers to facilitate commercial transactions.

BACKGROUND OF THE INVENTION

Traditional Marketing

The marketing of goods and services to consumers has always been more art than science, and the science aspect has been rather inexact. The inexactness of the science derives primarily from the fact that vendors are unable to obtain, at least without prohibitive cost, sufficiently accurate information concerning consumer's actual preferences, either individually, or in the aggregate. The vendor's strategy for ascertaining aggregated consumer preference data is, presently, to concentrate on segments of the consumer market, but they are only able to isolate or define these segments at a prohibitively high cost.

The vendor's study of segments of the consumer market allows a vendor to study the behavior of the whole of the market by studying the behavior of each of a number of smaller groups of consumers in the market (market segments) and aggregating the behavior over all of the groups. The key to such segmentation, however, is the selection of the factors used to determine which consumer is in which group. Each factor selected must be related to the predicted behavior in order for the segmentation to be effective.

Generally, the factors the vendor selects to define a market segment are based upon demographic data which is costly to compile. The principal methods of compiling demographic data have been surveys and census data. Because census data is typically derived by extensive survey, the methods are essentially survey-based.

The survey method of obtaining market segment data typically consists of posing a number of questions of two types. The first type of question is for ascertaining the demographics of the surveyed consumer. The second type of question is for ascertaining the consumer's purchasing behavior with regard to the relevant product. Once the survey is complete, the vendor is able to define a proposed segment of the market based upon the consumers' answers to the two types of questions and then validate that segment by testing its response to product offerings. For instance, the vendor's market researchers might study all of the consumers who are male, married, of European ancestry, and in the group from 40 to 45 years of age, in order to determine their motor oil purchasing habits. These purchasing habits are then associated with those demographic factors, are studied for degree of correlation. If the degree of correlation is sufficiently high, a cause and effect relation between the factors and the admitted behavior is presumed.

This presumption is then extrapolated from the survey sample, to the entire demographic. In other words, the survey assumes that behavior of a small group of consumers that the vendor randomly selects and who share a demographic factor is the same as the whole group of consumers sharing that same demographic factor. In practice, these assumptions generally prove to be reliable enough to justify the cost of the survey, but all too often, just barely justified. Knowing, for instance, that most members of a constructed demographic group, (or "market segment") report the purchase of a particular product will not justify a vendor in presuming the same purchase by each member of that group.

Another method of studying segments of a market is the focus group. In this method, the vendor selects a number of demographic factors to define a group. The vendor then recruits consumer members of this demographic group and presents them with the relevant product. Their reactions to the relevant product are again assumed to be the reactions of the whole of the market segment that share these demographic factors.

Each method relies upon constructing a model of the segment of the marketplace, and from that model extrapolating the behavior of the market. If either the model is flawed or the group's behavior does not accurately reflect the market place, the resulting impressions of the marketplace are misleading.

Even once they have targeted an audience; vendors then must spend a tremendous amount of money to deploy the marketing plan. Specifically, even vendors who are equipped with reliable demographic factors likely to yield a sale, the vendor then must identify and locate which consumers share these demographic factors and thus belong within that segment. For example, if a bicycle manufacturer has learned that 25-45 year old, college educated, white males are more likely to buy mountain bikes costing over $900 than any other market segment, it is not possible to immediately offer such bikes to all those, and only those in that segment, because it is not possible to accurately and precisely identify them. Thus, defining a segment to target is one thing; hitting the target is quite another. A well-known example of this problem is direct mail from vendors to "potential" customers which is so routinely discarded that it is known as "junk mail. For the foregoing reasons, while current marketing does work, and products are sold, the process is extremely inefficient.

Most in marketing would admit to the existence of a sort of "Uncertainty Principle;" that the very act of observation will shift the outcome. Even when queried for information about their spending habits, consumers may consciously or subconsciously report information they believe the surveyor wishes to hear or information that makes them appear more appealing than would their purely truthful answers. For instance, few consumers would readily admit to purchasing large quantities of fatty foods. Yet, actual sales studies suggest otherwise. Even more importantly, most consumers believe they have certain preferences or spending habits but they are simply honestly mistaken. This kind of mistake is prevalent with recurring, but small and variable expenses such as groceries and phone charges.

Another problem with traditional market research is that the information gathered has a limited shelf life. Consumers often present a moving target to vendors. What is in vogue one day may well evaporate the next. Thus, even if consumers could perfectly self-report in a vendor's study, the results of that study provide only a "snapshot" valid only at the moment taken. Therefore, even the time required to compile the results of such a snapshot tends to diminish its value.

If the uncertainty in targeting a potential consumer could be eliminated by better knowledge of each consumer's actual buying habits, the known marketing techniques of market segmentation would assure more successful marketing. Rather than conducting surveys, or trying to guess the buying patterns of consumers or to trust their responses to surveys, vendors require a "window" into the actual buying habits of their market. In a well-observed market, such a window would be both accurate and dynamic thereby overcoming the principal shortcomings of current market study.

In summary, the principal short comings of market segmentation studies as currently practiced generally arise from three fundamental defects: 1) the approximation of the whole by smaller defined groups, sometimes referred to as sampling or extrapolation error; 2) lag time; and 3) the definition of the group and its behavior based solely upon the consumer's self reporting. Due to inconsistencies in and unreliability of self-reporting, the data is less scientific than that allowed by other "direct observation" disciplines. These fundamental problems are part of what the present invention solves.

Intermediary Marketing

What has been lacking is a promontory from which to view actual, objective, nearly contemporaneous, individual consumer purchase activity. If the actual purchasing practices and transactions of their actual and potential customers were known to vendors, vendors would be able to more accurately ascertaining segment or segments of the market to which the vendor's products would appeal, and to target their offers precisely to that segment. The buying habits and actual transaction data of all potential customer segments are nowhere comprehensively, aggregated or compiled in an accessible form, by either consumers or vendors. And, because individual vendors are generally unwilling and unable (due to differences in compiling such data and other reasons) to share what data they have as to the behavior of particular consumers, a more precise study is not likely to arise from vendor records.

Because neither end of the sale/purchase transaction will serve as a source of reliable market information, the answer must rest in the middle, i.e. with an intermediary. The only place to interpose such an intermediary is between the unreliable reporting of consumers and unavailable and incomplete data compiled by vendors. Between vendors and consumers there exists a well spring of purchase information contained in consumer bills.

The vast majority of consumer purchases leave a "paper trail" reflecting the exchange of goods or services for money. While cash sales do exist, the predominant method of purchase is, of necessity, some form of billing relationship. Especially in the fields of periodically purchased products such as telephone services or insurance, the billing component of the relationship tells a great deal about the actual purchasing habits of the customer.

Consider the traditional bill-paying model. Periodically, generally monthly, a consumer will pay bills to various utilities, vendors, credit card companies, and, perhaps, a mortgage holder. These payments are in response to bills mailed to the consumer. In this series of transactions, there exists a great deal of information that would be invaluable to the various vendors as to the consumer's preferences, and more importantly, willingness to spend money for various features and unwillingness to do so for others.

Should an intermediary be placed between the customer and the vendors when the vendors distribute their bills, the customer purchases of goods and services could be carefully tracked and stored for further analysis. As consumers are typically creatures of habit, what they do with their funds one month (at least in terms of categories of recurring expenses) they will likely do the next month and the next month.

The instant invention relates to the utilization of an intermediary between the consumer and the vendors to "read" the consumers' bills. An advantage of such an intermediary is that all of the consumers' transactions are "seen" by the intermediary. These transactions, whether by direct billing or by credit card, accurately and objectively convey the purchase habits of the consumers. The actual executed transactions by consumers reveal objective, and thus very valuable information about consumers, both individually, and in the aggregate.

If, either by means of electronic transfers of funds to pay monthly bills or by cataloguing the contents of bills, the intermediary would have access to the consumer's purchase patterns and habits data, and if that data were analyzed, vendors would be able to target their marketing much more effectively. Specifically, vendors' market segmentation would be derived from actual transaction data rather than subjective preferences prone to sampling and perception error. Vendors would be able to more precisely and accurately segment the market. In this way, consumers would be presented offers and terms with a much higher probability of being acceptable. Overall, the marketing goods and services with consumers would be more efficient.

Moreover, in the present invention, purchase habit information derived from transaction data can then be correlated with those same consumers' demographic information. Such demographic information can be obtained directly from the consumer, by traditional methods, or, to a limited but substantial extent, derived from the transaction data itself.

Regardless of how the demographic data is obtained, it is correlated against actual, objective transaction data. Thus, at its heart, the invention enables vendors to know exactly who, in terms of demographics, is buying what, and on what terms. Equipped with this knowledge, the vendors can sell and the purchasers buy goods taking advantage of the lower prices that result from increased efficiency in the process.

The efficiencies and advantages are not only for the benefit of the vendors, but also for the benefit of consumers. Specifically, as the marketing process becomes more accurate and precise in targeting willing consumers via the present invention, consumers in turn will tend to receive only those offers which have a high likelihood of meeting their needs. Hence, there will be less "junk mail," in whatever medium. Second, as mentioned, prices will be lower. Third, transaction "search" costs (that is, the time and hassle involved in "shopping" for more appropriate offers) will be substantially reduced. Fourth, the invention will permit the vendors to offer goods and services upon terms which, due to the described inefficiencies, were previously not available on the market at all. Put differently, the process known in economics as "price searching" will be simultaneously less expensive and more accurate, enabling vendors to create offers hitherto unavailable. Fifth, the present invention effects these advantages without involving more work for the consumers. Consumers simply must pay their bills as per usual, and that very process becomes the primary source of the raw data from which the present invention derives its improved information, and consequent efficiencies. Sixth, the invention ultimately reduces consumers' expenses, not only by reducing prices, but by making it more likely that the consumer is purchasing those combinations of goods and services and terms which are most appropriate, that is, most closely track, that consumers' demands.

In effect, the invention eliminates, or at least reduces, paying for goods or services that the consumers neither want nor need, but have hitherto been required to purchase as part of a package with goods and services the consumer does want and/or need.

The banking industry has presented one example of a limited intermediary. Consumers, as taught in Motoyama, U.S. Pat. No. 5,913,202, purchase mortgages and investment instruments from a plurality of banks. In order to interact with the intermediary, the consumer must register and in the act of registering, provide the intermediary with information as to subjective preferences in banking services and in financial products. A banking intermediary, which acts as a clearinghouse for these services or financial products, compiles offers that meet the consumers stated preferences and presents them to the consumer.

Motoyama falls short of the advantages of the instant invention. First, the products and services the Motoyama invention presents to the consumer are selected on the basis of easily distinguishable attributes. For instance, interest rates, term, principal, etc., on loan instruments are numerically described attributes and hence easily categorized and compared. Throughout practice, the invention gains no greater insight into the consumer than the consumer himself was willing or able to describe in enrolling. Motoyama also fails to teach collecting information from one's household bills and using that information to find the most suitable product or offer terms. The instant invention is distinct from Motoyama in that the instant invention matches customers to products by utilizing and analyzing the consumer's own purchase history.

Peckover, U.S. Pat. No. 6,119,101, also recognizes the potential of a system of matching consumers with vendors. Specifically, Peckover teaches a system for electronic commerce having personal agents (computer programs with the ability to perform tasks) that represent consumers and providers in a virtual marketplace, such as is presented on the Internet. The consumer sends the specifications of the product desired out into the virtual marketplace. These consumer personal agents create decision agents that shop for products and return the results to the consumer. The consumer software agent works as a sophisticated search engine that further assists consumers in comparing and ranking the found products. Among the shortcomings of Peckover is its inability of deriving and/or validating the consumers' preferences from their purchase history.

In contrast, the instant invention allows far greater precision in both the search for and in the recording of the purchasing of goods. The instant invention has the ability to create a complete marketplace and in doing so, catalogues and describes with a precision that is not available with the system of agents Peckover describes. With each purchase, the customer of the instant invention reveals more of his likes and dislikes. The Peckover invention has no ability to deduce and/or project the needs of the customer from the customers actual transactions.

Instead, Peckover relies only on the history of customers' searches. By tracking and reviewing customers' search history, the Peckover invention is able to inform vendors of the wants of consumers. Because it is neither comprehensive, i.e. contains all of consumer's purchase patterns, nor does it catalogue the terms of the purchases, there is little data to extend the information beyond that garnered by following a shopper as that shopper window shops. The instant invention, on the other hand, learns about the customer's likes and dislikes by watching all of the purchase decisions, and the terms of the actual transactions. Furthermore, unlike Peckover, the instant invention actively compiles demographic information about the customer and constantly correlates it against the pattern of purchases contained in its customer database. Because each of these purchases is defined by the identity of the product purchased, tiny distinctions between competing and virtually identical products reveal the customer's likes and dislikes right down to "label affinity." After compiling such data and examining that data in light of the customer demographics, the instant invention can predict behavior for groups of consumers.

SUMMARY OF THE INVENTION

The object of this invention is to interpose a Data Processing System ("DPS") between the consumer and vendors, and in light of the information garnered by direct observation of consumer buying habits, unite vendors and likely consumers for the sale of goods and services. The DPS may stand-alone or might be hosted by a consumer bank, a credit card issuer, a debit card bank or an intermediary electronic bill paying service with access to some or all of the customer's account or transaction data. The only requirement is that the DPS is positioned, directly or indirectly, to analyze some or all of the customer's bills or bill payment transaction data.

The instant invention can be practiced in a "stand alone" mode as described. A more advantageous mode of practice of the invention occurs when the entity in control of the DPS "partners" with a portal or data aggregator at which a consumer's bill paying activity transaction data is aggregated in electronic form. Such portals or data aggregators are sometimes referred to as Consumer Service Organizations (or "CSO") One example of a CSO is a consumer banking institution.

Such a partnering would allow electronic bill paying once the entity presents the bills to the consumer. In such an embodiment, the customer would receive the bills from the various vendors through, or in connection with, the CSO. (In some cases the CSO itself could be in control of the DPS, rather than in commercial partnership with a separate DPS entity). Upon reviewing such bills, the customer would designate an account from which a bill is to be paid and direct payment. After that payment, the CSO would then pass the payment transaction data to the entity in control of the DPS. The entity in control of the DPS would then, on behalf of the consumers and vendors, present and pay bills in an integrated environment. Alternately, the DPS would simply have electronic access to the stream of transaction data generated by the electronic bill presentment and payment mechanism.

While such integration is not a necessary feature of the invention, when practiced with the invention, it greatly enhances its efficiency and assures greater customer acceptance of the invention. Additional benefits of a transaction database tied to a bill paying and/or presentment engine or related process (a CSO, or other such data aggregator, such as, for example, for electronic bill presentment and payment: cyberbills.com, paymybills.com, yodlee.com) include the customer's ability to budget with a precision that has not been previously available. Because each expense is broken down into its component parts, consumers may budget by exactly the number of units required. Such a system is more completely described in our other Provisional Application No. 60/249,232, "SYSTEM FOR DYNAMICALLY DERIVING OPTIMAL TRANSACTION TERMS FROM AGGREGATED CONSUMER TRANSACTION PROFILE DATA (3).

By allowing the DPS to serve as the customer's post box for bills, or to read the transaction data stream from the electronic bill payment process, the records the DPS compiles would yield great insight into consumer's true buying habits. Augmenting the traditional methods of developing demographic data (surveying, census data, and data compiled by consumer credit reporting agencies), the analysis of bills ascertains with precision and accuracy, the buying habits of a particular customer and, in turn, for a complete market of customers. Each bill contains details specific to the usage of a product by a specific consumer. The inventive system, then, studies the line item details in the bills in order to determine the extent to which the consumer purchases a particular product within a given time period, and upon what terms.

To effect the analysis of these purchases, the DPS develops a comprehensive and precise catalogue of goods and services, a Transaction Database. This database "learns" new offers by comparing them to existing line items it "knows" and when such a good or service is distinct from those known, the system assigns a statistical "name" to the good or service, such "name" to reflect similarity, where such exists to "known" goods or services.

Controlling software or controllers exist within the DPS which sort and categorize these goods and services such that like goods and services are associated with like. Definitions of new line item products are compared and contrasted with those existing within the database, and as a result of that comparison, both the existing and the new product definition might be refined. For instance, the existing definition of a 35 mm still camera might be modified when the same manufacturer offers the still camera with an auto-focus feature. As a result, the transaction database catalogue contains distinct but largely similar definitions of both the auto-focus and the non-auto-focus instances of the product.

Before goods or services transactions are entered into the database, each goods or service line item is dissected into all of its constituent or elemental parts. As with, for example, insurance, various coverages are offered at particular prices. The whole product consists of a bundle of the coverages. For the purposes of the DPS, these coverages must each be separately defined. The bundle of these coverages is then reconstructed into the product offering. The idea is to arrive at basic component definitions derived from commercial compound transactions.

The analysis engine dissects or reduces a purchase into its most "elemental" components in order to capture the total economic effect of the purchase. Additionally, the analysis engine weighs the elements of each purchase in order to optimize potential purchases. What would save the consumer money?

Vendor's rules and, in some cases, the law, require additional compounding or "bundling" of these purchases. The components of a purchase may include fixed recurring costs, fixed one time costs, variable costs, and incentives.

For instance, federal, state, and local taxes attach to most sales and are a mandatory part of the bundle, in spite of the fact that these taxes add no value to the bundle of rights purchased. Similarly, a telephone bill may include, not only the fixed price of monthly service, but also such charges as a one-time "hook-up" charge and various set up fees that are necessary adjuncts to providing services on a monthly basis. In sum, the contract to provide a service is, generally, a contract to provide a group of products.

In the absurd extreme, failure to recognize this fact of bundling would allow two long distance telephone service offers to stand as equals even if one required a million dollar "set-up" fee. Such offers would not be equal in the eyes of the purchasing consumer. In analysis of a number of purchase candidates for a particular consumer, the analysis engine breaks the potential purchase into discrete and comparable elements.

For a product or a service, the elements of the purchase may be identical between several vendors. In the simplest instance, where two competitors sell the same television under the same tax and delivery rules, the less expensive set should represent the better purchase for the consumer.

All economic factors yield to such analysis. If, for instance, the sales tax that attaches to a purchase from one vendor does not attach to that of another vendor, the second vendor's offering should be the better purchase in the eyes of the consumer; the analysis engines seeks to similarly score the purchase.

Non-economic factors play a part in shopping as well. When the consumer seeks to deal with a burst pipe, a three-week delivery lag would disqualify even the cheapest of mops, or more likely, restoration contractors. The analysis engine must score such non-economic factors as delivery time to mirror consumer shopping. As the example suggests, non-economic factors weight the purchase price rather than to add or subtract from it. The price of the product is multiplied by a factor corresponding to the speed with which the vendor can meet the need of the consumer. The weighting need not be "straight line." In the earlier example, having the mop or restoration contractor services within hours of the burst makes the mop or services very valuable; having it on the second rather than the third day after the burst should decrease the relative value.

From product to product and factor to factor, the weighing protocol will vary. Vast data available due to the many consumers and the many bills for each consumer, will allow the analysis engine to develop comprehensive weighting factors and scales for every product within the DPS and associate those factors in the analysis. In an example of a cellular telephone, the analysis engine would consider the fixed, monthly, costs and multiply them by a factor derived from coverage ratings (perhaps those from J. D. Powers or other such rating sources), thereby scoring the competing services, for comparison.

Known sources and weighting for rating families of products exist. Journals publish such ratings regularly; Consumer Reports rates numerous products as do journals unique to fields such as PC Magazine for computing and Runners' World for running shoes. Where a truly unique product comes into existence, studies by known methods described above as marketing techniques can be used to derive the weighting scales.

As the experience base grows, the analysis engine continues to check the weighting scales against the experience base in order to refine the weighting. The factors should predict consumer choices and where the analysis engine finds a variance, it increments the weighting factor and re-runs the analysis. In time, this loop should assure further and further refinement until the analysis engine can accurately predict each transaction.

Once these bundles are analyzed; the system catalogues the data derived from these bills in the Customer Database, then "recompiles" or returns the read and analyzed bills, and transmits them in electronic form to the customer. Simultaneously, the fact of the purchase is stored in the Customer Database. As the amount of information in the Customer, Vendor and Transaction Databases grows, the demographic information about each consumer becomes more comprehensive. As the data set becomes more comprehensive, the quality of the inferences to be drawn from the data increases. Each bill conveys and refines the picture of the customer. Each elemental transaction provides clues as to who purchases an individual good or service.

When compared against known demographic data for the customer (derived, as earlier stated, by customer interviews and third party reporting agencies, or even from analysis of pre-existing transaction data), each purchase leaves a benchmark for gauging actual, and projecting future market penetration. For instance, when a middle-aged male head of household, earning in excess of one-hundred-thousand-dollars, and of European descent purchased Valvoline™ motor oil, recording the event refines the database.

Aggregate this single record of purchase, across the many purchases in a billing cycle and then across the many purchasing customers, and the inventive system has created an observable, and analyzable micro-economy.

That is, that "micro-economy" in fact previously existed within the larger economy, but it was previously not isolated, and hence not meaningfully observable or amenable to analysis. The DPS analyzes these purchases over time. The system contains a library of known forecasting methods and by iterative analysis of the data, determines which method produces the most accurate forecast for a given consumer by both applying the history of the consumers past behavior and analyzing the habits of groups of demographically similar consumers. This forecasting method is then used to predict consumer behavior for the next time period. Risk analysis is applied to the forecast to minimize the economic effect if the forecast varies from the actual usage.

Once the catalogue of products and services (Transaction Database) is functionally operable, having a minimum amount of data necessary for analysis, the system is able to predict the behavior of the market defined by customers contained within the Customer Database. At this phase the inventive function includes a method and system for providing an offer, which of all available offers, is the best available offer for a given consumer. Offers are collected from one or more vendors and stored in an offer repository (Vendor Database). The system analyzes these offers in light of the predicted behavior of its customers. In each instance, the offer is ranked according the particular market segment which has shown the greatest market penetration in their past behavior.

Each component of the offer is then analyzed by iterations to optimize market segmentation. To achieve optimization, the system deems several known demographic factors to be relevant of those known factors. The market is segmented by such factors and market penetration is gauged for each segment. The results are recorded. The system then varies the factors and, again, gauges the impact. Once that segmentation of the market that produces the greatest market penetration in several of the segments is found, those demographic factors that produced such penetration are deemed relevant.

Now the offer is transmitted to all customers likely to purchase that good or service within each segment. Along with the bare offer, the system sends an projection (typically annualized) of the cost of such a good or service based upon the consumer's own prior use. Additionally, the system attaches those mandatory components appropriate for "real world" comparison. In alternate embodiments, the system can send several competing offers with the same annualized projection. The consumer then selects the offer that represents the best value.

Segments are created and allocated dynamically as new offers are received. The computing capability available at moderate prices, allows the constant computation and re-computation of offers. Offers that previously met no market need are reanalyzed as offers are added to and deleted from the system.

Just as the system refines its own knowledge of the customer's likes and dislikes through market segment iteration, the informed selections drive the vendors of such offers to optimize those offers in terms of either economies or goods or services offered. In order to be competitive in this DPS-defined market, the offer has to be adequately competitive to make market penetration. The cost of designing offers in this environment would be substantially lower than the costs of production, design, advertising, offer management, etc. of a traditional offer sent to the real, but diffuse world.

Towards that same end, the system allows the vendor to construct a bundle of goods or services in a manner to assure greater market economies. For instance, should a vendor elect to sacrifice margin in order to secure market share, that vendor can project market penetration with greater accuracy with the assistance of the DPS data engine. In light of the projection, the vendor can continue to optimize the offer, without risk, in order to assure greatest effect.

A second incentive exists for optimizing offers. The system allows increased consumer mobility. By facilitating the consumer's immediate and automatic move from one periodic provider of goods or services to another, the vendor that does not change to meet the desires of the market risks nearly immediate market isolation. Thus, the system envisions a very mobile market.

The mobility of the market is maximized if the transaction cost, especially search cost, for moving from one vendor to another is minimized. To accomplish this capability, the system is designed to allow the customer to define the factors for optimization and then to back away from the system. This "set and forget" mode allows the system to optimize in the background, with no transaction costs in terms of consumer time or effort spent in shopping for periodic providers. The effect is complete, efficient and transparent coverage for the customer with a minimum of customer effort.

In accordance with other aspects of the invention, vendors will present offers only to likely consumers, thereby maximizing the efficiency of the marketing process. Expenses associated with advertising, marketing and storefront warehousing and supply are eliminated. Focus groups are not necessary and the vendors are not required to risk losses due to test marketing.

In accordance with still further aspects of the invention, vendors will mold offers to the demographics of available consumers and by that means, more realistically project margins on sales of goods or services as the same are affected by volume.

In accordance with yet other aspects of the invention, vendors will be able to offer services that would be otherwise unprofitable due to the marketing necessary to reach otherwise scattered likely consumers, thereby increasing the vendor's competitive lines of goods or services. Thus, if an obscure market for a unique good should surface from analysis of purchasing habits, the vendor may consolidate that market, offer the obscure good and capitalize on that demand without the great expenditure of marketing to geographically or demographically diverse consumers.

In accordance with still another aspect of the invention, consumer's individual purchase patterns are not disclosed to vendors, rather the consumption behavior of a universe of consumers is presented, thereby allowing maximal market penetration without compromise of private patterns of behavior by individual consumers.

BRIEF DESCRIPTION OF THE DRAWINGS

The preferred embodiment of the present invention is described in detail below with reference to the following drawings.

FIG. 5 illustrates one hypothetical customer's aggregated payment obligations for one billing cycle, typically, but not necessarily, one month;

FIG. 6 illustrates the hypothetical customer's telephone bill in two cycles and the several line items the bill comprises;

DETAILED DESCRIPTION OF THE PREFERRED EMBODIMENT

For the purpose of this application, the term software is deemed to include instructions as to use.

According to the principles of this invention, certain limitations imposed by conventional pricing systems are eliminated allowing for a more fluid responsive micro-economy. A market, comprising customers of the inventive system (also referred to as Data Processing System or "DPS"), is observed closely in all of its purchasing activity. As a result of the knowledge garnered in that observation, the customers can purchase and the vendors can sell goods that comply with the customer's needs with great efficiency. Efficiencies in sales are realized in many ways, including the extremely competitive pricing strategies that vendors tailor to this market.

Figure 1:
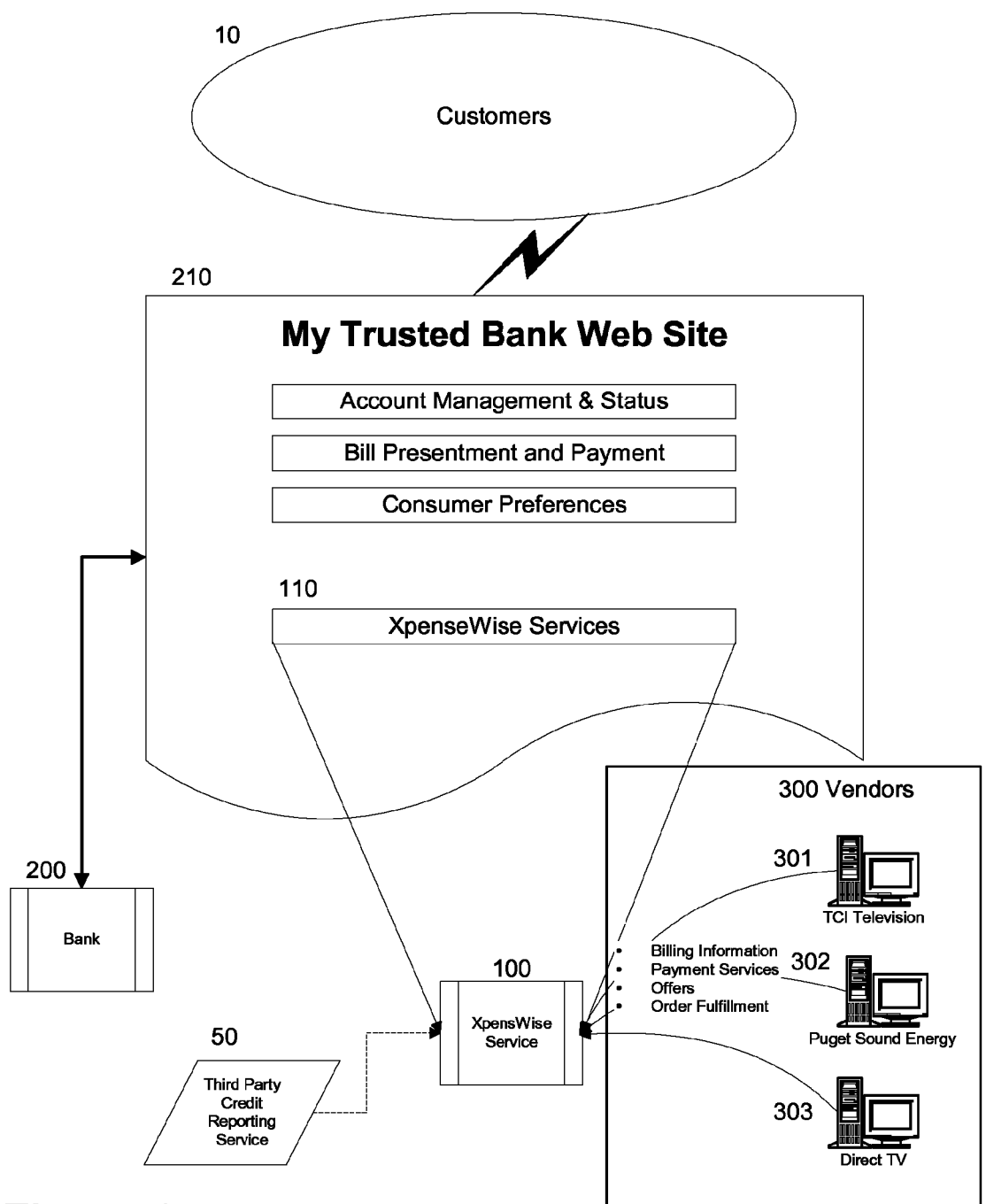
FIG. 1 illustrates the presently preferred of several embodiments of the invention, here being marketed with a natural partner, banking services.

Referring to FIG. 1, while the DPS might be used in partnership with a credit card issuer, a consumer debit card account, a credit union, an electronic bill-paying service, or other similar service, such a partnership is not necessary. The invention can stand alone without any diminution of its function. This FIGURE illustrates the partnering of the inventive system 100 with a consumer bank 200 and linked on the bank's Web page 210. Much as some customers of credit unions are also granted access to discount warehouse retailers of goods, customers of banks or other institutions might be granted enrollment in the DPS as an incentive for doing business with the bank. Because of the savings produced by the efficient market defined by membership in the DPS, customers might also pay for the privilege of enrollment. In either regard, customers require some access to the system to fully participate in the market.

Figure 2:
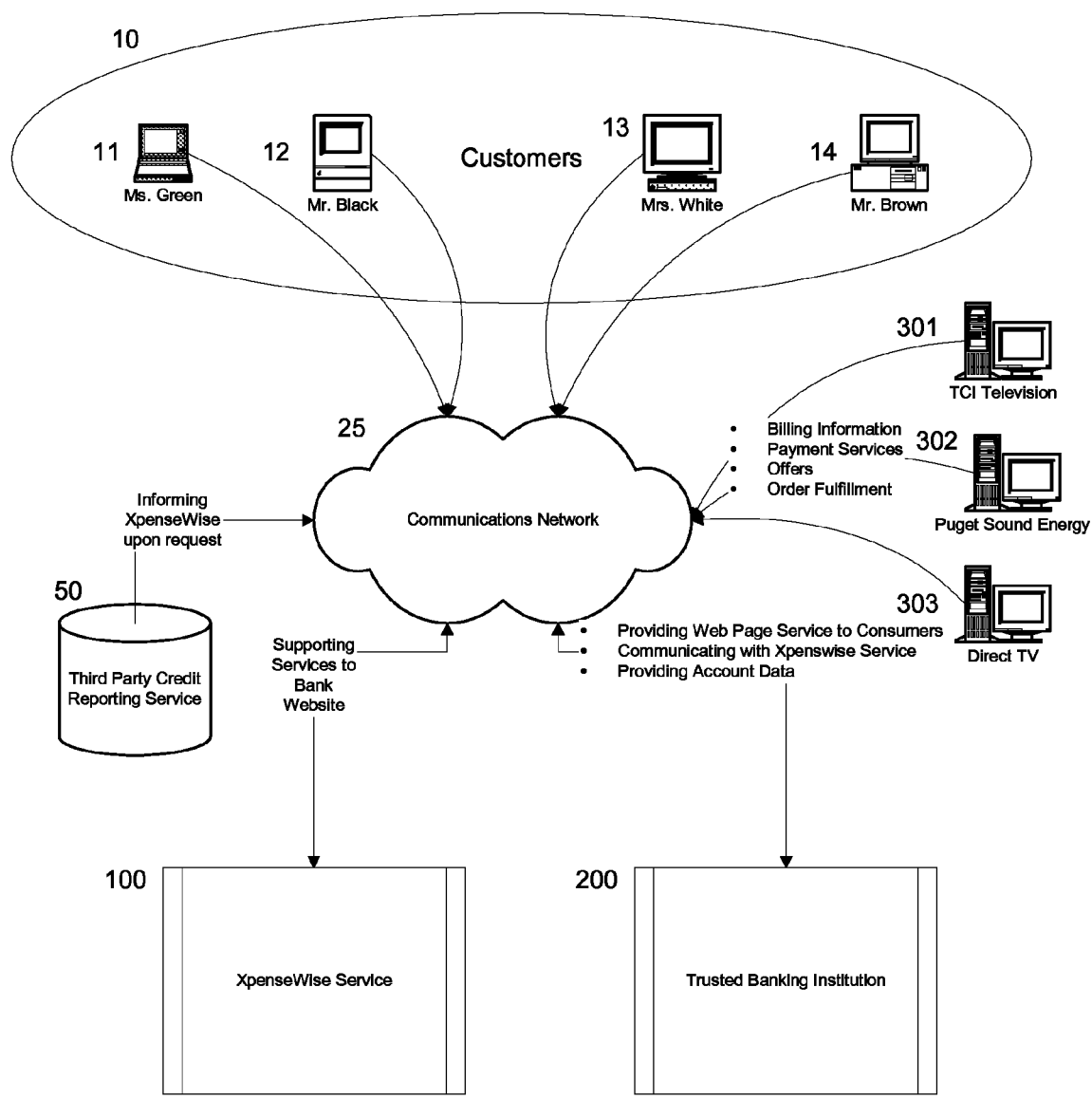
FIG. 2 illustrates the hardware necessary to enable this preferred embodiment through the use of a communication network.

Customers 10 gain access to the services of the inventive system by means of the Communications Network 25 portrayed in FIG. 2. Also shown are communicative links to vendors 300 and such third-party information services as Consumer Credit Reporting services and other sources of third-party demographic information which optionally may supplement that provided by the customer upon enrollment.

FIG. 2 illustrates the hardware connections that provide the context of environment for the preferred embodiment of the invention. They presently preferred means of communication would be a communications network 25 such as the Internet. As is discussed below, however, the point to point communications necessary to practice the invention can occur by any communications network, as will various WAN and LAN technologies including wired and wireless technologies or any combination of all of the communication means. Indeed, because no node of the network requires real-time access, the principal Communication Network 25 can be either by telephone operators in verbal communication over telephone lines or, as is discussed below, communication and bill forwarding through courier or U.S. Postal Service. In short, it is more important that communication occur than that the communication be immediate. Speed is not the essence of the communication but such speed as the Internet supports enhances the "mobility" of the market defined by the invention.

Also portrayed in FIG. 2 are the outside sources of information necessary for maximum utilization of invention, along with the DPS 100. These are the customers 10; the vendors 301, 302, and 303; and the third party credit reporting service 50. Also shown in this embodiment is the host bank 200. In this diagram, the outside sources of information are electronically connected to the DPS 100 by means of a communication network, preferably the Internet.

Figure 3:
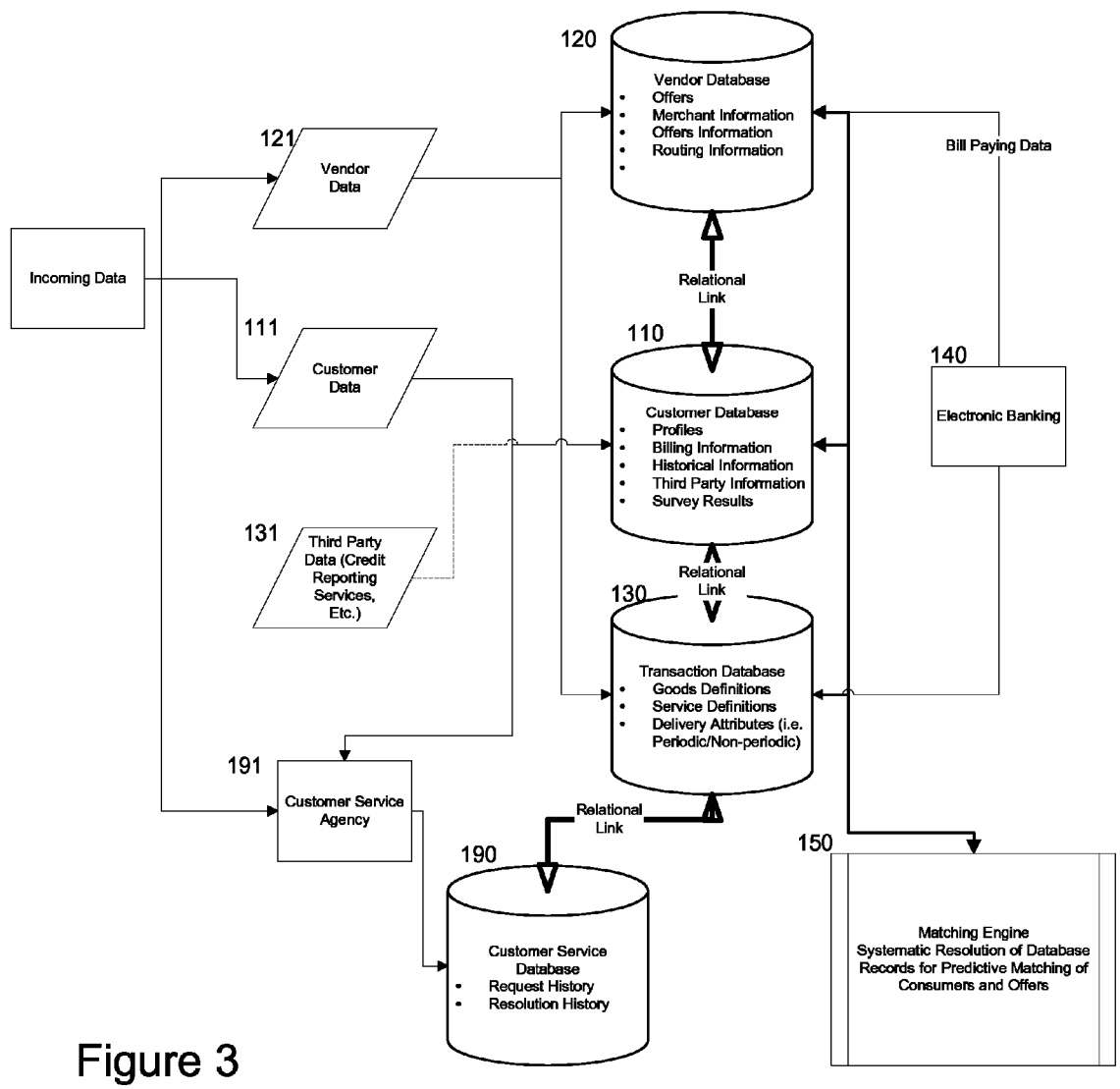
FIG. 3 illustrates the components and interconnections of the invention comprises.

In FIG. 3, preferable operational components of the DPS 100 are described. These include relational databases 110, 120, and 130. In the Customer Database 110, the DPS stores Customer Data 111, i.e., all information from whatever source that might be useful in demographic studies as well as all information personal to the Customer. The Customer Database 110 will include all credit history, all purchase history, responses to surveys (if any)*, and the initial listing application information, including the associations between vendor and customer for the production of bills. The Customer Database is also the repository for any obligations owing on bills from those vendors.

The Transaction Database 130 is the dictionary to the system, containing, as it does, the elemental definitions of the goods and services described in the system. While the Vendor Database 120 will contain the definitions of bundles of products, it will only do so as series of these definitions. The definitions of goods will not contain prices, but will define the salable unit. Additionally, the transaction database will contain such tags as are necessary to indicate definitions of persons projected to have an affinity to the product in question. These definitions are dynamic but are stored here with the product.

The Vendor Database 120 carries all Vendor Data 121. Beyond identification data, the Vendor Database 120 will carry associations of vendors with defined products; prices in any current offerings along with bundling rules associated with said offering; and any conditions upon the delivery of relevant product.

Finally, the Customer Service Database 190 stores all requests for service on existing transactions. Service, in this sense, means returns, stop payments and other adjustments on accounts. The Customer Service Agency 191 handles the calls for service and the results are stored on the database 190. While not necessary for the practice of the invention, its inclusion here is to indicate the inventor's belief that returns may tell as much about the customer as the initial purchase.

Another alternate embodiment allows, not only the receipt of bills but also their payment. Once the consumer has redirected billings to the DPS, the consumer must also arrange payment of bills through transfer of consumer's funds held at various banking institutions on consumer's request to do so, in effect a draft drawn on the individual banking institution, by consumer's direction through the DPS 140. Upon presentation to the customer, the customer has the opportunity to direct payment by means of any of several known Electronic Banking means, a known practice that enhances the utility of the instant invention. Payment may be either to the DPS for payment to the individual vendors or directly to the individual vendors. Wire transfers common in the banking industry facilitate payment.

Figure 4:
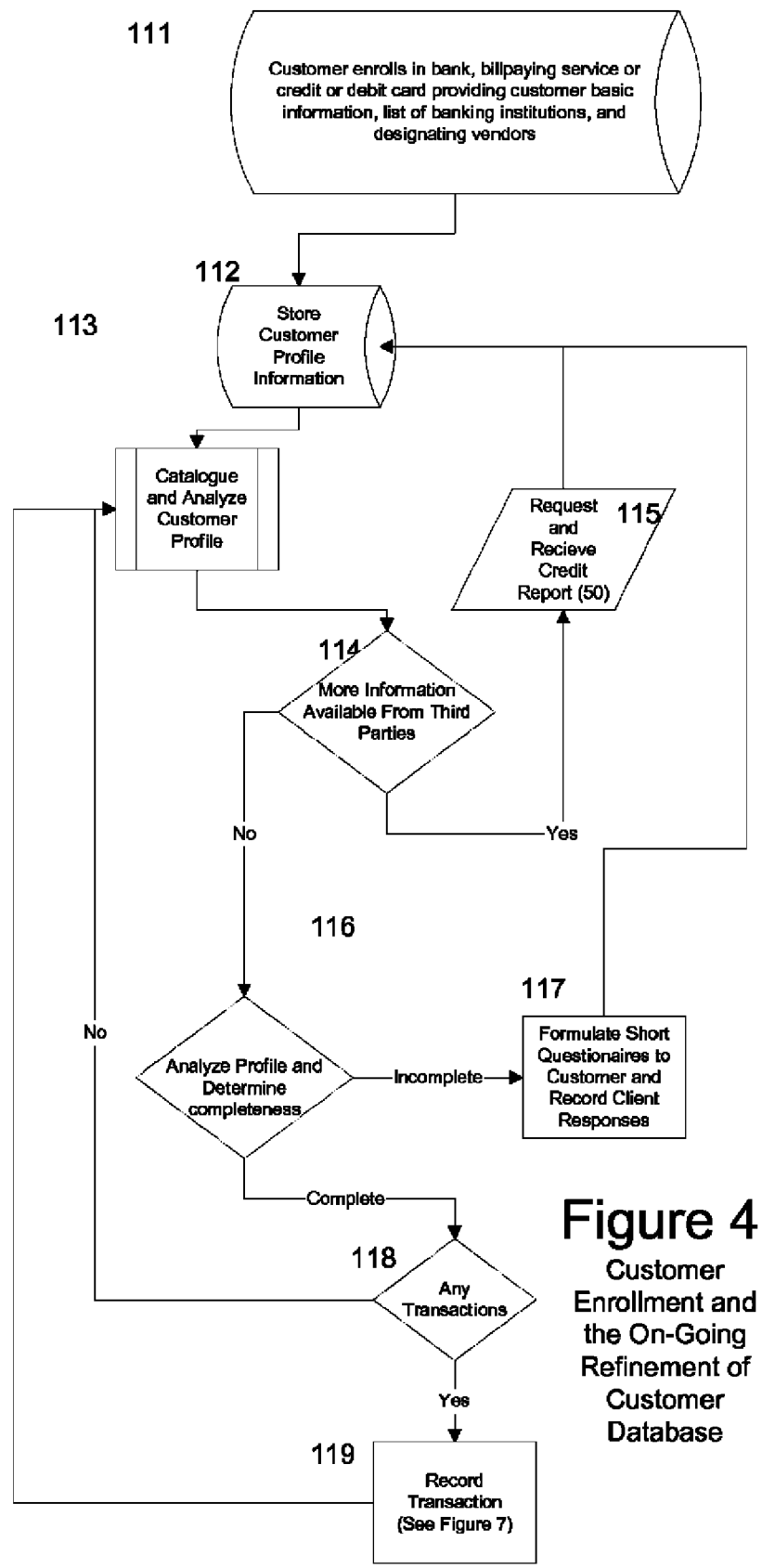
FIG. 4 illustrates the customer's enrollment in the system and analysis that constantly refines the contents of the Customer Database.

FIG. 4, a flowchart, describes customer enrollment in the DPS and the on-going refinement of the Customer Database information stored in the Customer's name. At step 111, the customer initiates the process necessary to enroll. This process may be a part of enrollment at a bank, or credit union, or it may be a stand-alone step. At this step 111, the customer not only gives a list of regular vendors to the DPS, but also directs the vendors on that list to send their bills, not to the customer but to the DPS. These data are compiled to create a record at Step 112.

Over time and as the system functions, the recording of various transactions and optionally, the customer's own response to questions posed, refines this record. Optionally, the invention is the data within the system may augment the Customer Database, with data from questionnaires posed to the customer on a regular or occasional basis. After enrollment at step 113, the DPS examines the information garnered against its own standards for operable completeness. In the event that the information is either incomplete or contains apparently inconsistent information 114, the DPS will request and receive supplemental information from a third party, such as, for example, credit reporting agencies 115. In light of the additional information garnered, the information is again compiled and tested for completeness. If it is still incomplete after all available supplemental third party information has been received, the enrolling customer may be contacted for clarification.

Once the customer is deemed acceptable, based upon the information garnered, the customer joins the population of the "closed market" defined as those customers in the DPS Customer Database. The DPS examines each customer as member of this "closed market" for demographic information that will allow the DPS to conduct market segmentation study. If, for example, in the course of the analysis 116 of demographic data, the Matching Engine determines a demographic factor for segmentation of markets is necessary, and, it further determines, that information with regard to that factor does not exist for a particular customer, the Matching Engine software will compose a question or series of questions or data queries to determine the existence or non-existence of this factor for that customer. Upon receiving the response to that question, the software will store the information as part of the Customer Profile 117. Similarly, if the information is of a type that is best garnered from third-party credit reporting services 50, the engine will compose an inquiry and transmit the same 115. The responses will be recorded at 112.

At such time as the DPS receives information about a transaction 118, it will record the same 119 by recording an association to a specific code or series of codes in the Transaction Database 130. The specific means of doing so is set out at FIG. 7.

FIG. 5 is a hypothetical bill to the customer, the contents of which is received at, or entered into, the DPS. Such bills are presently preferred source of transaction data for populating the DPS Databases, because, in accordance with the invention, added transaction data assures the precision of the marketing efforts and for that reason, the information harvested from real bills, electronic or otherwise, is ideal. Drawing from two bills to a hypothetical customer, May 350 and June 360, the DPS will derive some facts about the bundling of services and about the customer.

Cable Television

For both the thirty-one days of May 351 and the thirty days of June 361, the bill from TCI is in the amount of $37.50. Thus, the system knows that the cable services are sold at a fixed monthly rate. Additionally, the price of the services, likely itemized would yield the precise nature of the product bundle.

Energy Consumption

Comparing the two months, the consumer paid $32.19 less to Puget Sound Energy in June than in May 352, 362. Statistically, June is a warmer month than May. Yet, the energy bill went down. A consumer living in the Pacific Northwest will have drastically different power requirements than a similar consumer in the southeast, northeast, or the southwest. The customer's address pinpoints the climate for the DPS. Prevailing warmer temperatures in June may cause the consumption of energy to go down over May.

Puget Sound Energy, in our example, happens to provide electricity as well as natural gas. The distinction between a coarse analysis of amounts paid and the finer analysis of line items is evident; that distinction underscores the importance of a line item analysis.

Satellite Communications

The consumer seems to have a fixed DirecTV (satellite television) bill 353, 363.

Consumer Credit Cards

The consumer seems to be paying a revolving credit card off with Discover Financial Services 354, 364. Each monthly payment is in the amount of $250.00. Generally, the amount due on a credit card would be reflective of purchases and unlikely to total in round figures. Evidently, the customer is using the credit card as a financing device. An opportunity exists for substituting a bank for the credit card as financing device. Hence, the analysis of credit card carrier as finance company or vendor will allow the shopping for credit cards. Discover, like almost all credit card issuing companies, has various financial packages that it presents to its consumers. In fact, each package has several variables including introductory interest rate, regular interest rate, annual fee, grace period, etc.

A credit card company is both a vendor and, from the standpoint of the DPS, a messenger. On the itemized bill, transactions from numerous vendors would indicate the purchase of several products. Even the selection of vendors yields information as to the demographics and buying patterns of the customer.

Insurance Payments

The consumer pays a fixed monthly insurance premium with State Farm Insurance 355, 365. The consumer makes a payment to an insurance company of a fixed amount. It is essential to be able to review the line items in order to determine the bundle of coverage purchased.

Long Distance Telephone

The consumer seems to have made more long distance telephone calls with the long distance provider 356, 366. This will be the exemplar for the individual line item analysis. For such analysis we turn to FIG. 6.

This FIG. 6 contains the typical information found in a long distance telephone bill. The level of detail found on this bill demonstrates the nature of product bundling by retailers. Some typical examples of this bundling are evident in the several rates that exist; one such example is at 356.10, in contrast to either 356.20, or 356.30. Due to the distinct times or zones in which the calls are made, the rates for each call are different. Nonetheless, the rules for determining the rates are definite and reproducible. At the DPS level, study of telephone calls for an individual consumer or across the several consumers will quickly yield a mapping of rates and conditions. Similar rate differences exist for international calls.

Also evident is regulatory bundling at 356.60 and 356.70. City 356.60, state, and federal taxes are generally reckoned on a percentage of call volume basis. On the other hand, 911 fees 356.70 are generally charged on a monthly rather than on a per volume basis. Thus, the total of non-service fees, 356.80, is complexly variable.

Figure 7:
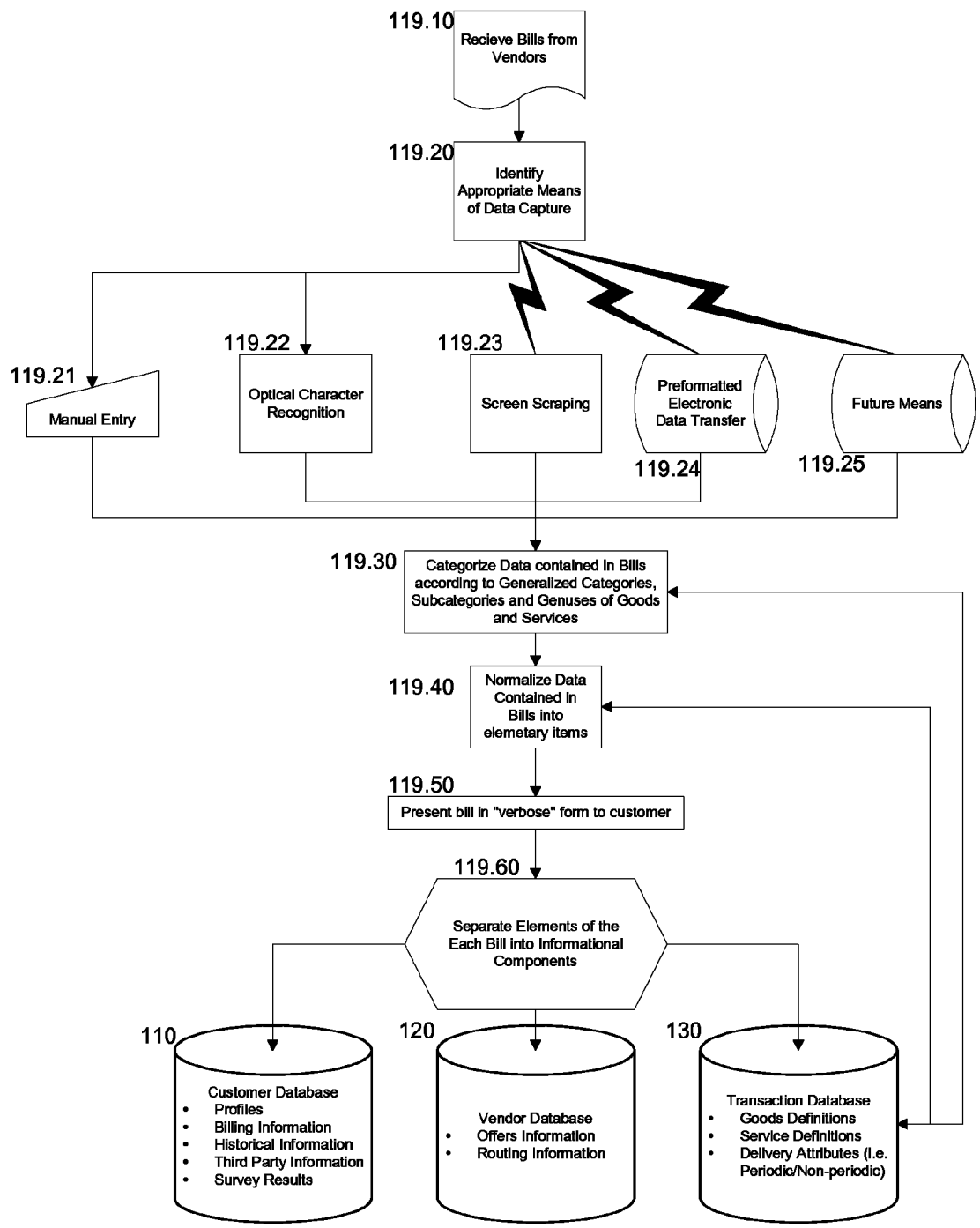
FIG. 7 illustrates the system's method of analyzing and cataloguing the bills as they are submitted.

Acquiring data from the bills, in paper form, for analysis is presently accomplished by the use of any of three current technologies depicted in FIG. 7: Manual Data Entry 119.21; Optical Character Recognition 119.22; or, "Screen Scraping 119.23. It is envisioned that as the invention gains adherents, the various vendors will have a standardized means of sending all such bills, either by specialized software 119.25 designed by the DPS or by means of Extensible Markup Language (XML) 119.24 an existing standard for the interchange of such information. Additional options became available via true electronic bill presentation and payment. Until such time as the software means is generally available:

Manual Data Entry 119.21

Manual data entry is by far the most labor intensive, most prone to errors, and least desirable. However, until automated information interchange mechanisms have 100% penetration, there will always be some need for manually entering data. In effect, a data entry operator must translate all of an individual paper bill's contents into electronic data and that data is, in turn, entered as the consumer's bill.

Optical Character Recognition 119.22

In this method a paper bill is entered into a scanning system. An optical character recognition (OCR) system will scan the page for pertinent transaction information from the vendor, then convert the information to machine readable form, and, then, automatically enter it as the consumer's bill. As with manual data entry, this system is less than desirable because bills can be mutilated, printing can be too light, or other such defects that would cause the OCR system to produce incorrect results.

Screen Scraping 119.23

Modern electronic banking systems use CRT in character or graphical presentations. The DPS can simulate the actions of a consumer over a computer network. Once the DPS has identified itself to an online bill (complete with details), a scanning system can be employed to lift the information off the screen—hence the term screen scraping. Like OCR, screen scraping is a little prone to error mostly because the online bill may change its form from time to time for aesthetic purposes, or simply because information needs change.

On the vendor's billing cycle, a bill is sent by any of the means set forth above to the DPS. Either the vendor or the DPS will encode the bill, line item by line item into a standardized list of the constituent parts 119.30; standardized, that is, to reflect definitions contained in the Transaction Database 130. Here is an essential step to ensure sufficient granularity of information. It is the object of this standardization to allow the bill to present a good or service in terms of basic units regardless of the identity of the vendor, so that aggregation and/or comparison access vendors is possible. Goods and services are treated as fungible commodities under each definition in the DPS's Transaction Database 119.40. Thus, for example, if a kilowatt hour of electricity at a given time of day in a given season is assigned the definitional designation of 1200 090 111 (much as inventory items in a store receive UPC coding), then, no matter the particular vendor supplying the kilowatt hour, it is encoded on the bill as "n units of 1200 090 111@ $2.11 per unit." Precision in pricing, i.e. decimal places describing the price, will extend as far as necessary to accurately rate the good. Similar definitions work for all goods and services. For example, United States to Tokyo telephone services between hours of 09:00 to 11:00 GMT for "m" seconds might bear a code 3600 313 007 @ $0.099876 per unit. Any taxes or other charges are coded similarly as products and referenced with an association in the Vendors Database making them part of a mandatory bundling. Similarly, if there is a dividend or giveaway, that dividend is coded for its product identity and then bundled with the product under the rules in the vendor database.

In one embodiment, the DPS then re-assembles the bills in line item form and presents them to the consumer 119.50. These bills are descriptive using both the vendor's narrative description and the DPS coding of the bill. Similar coding and presentation is currently used in the medical community in response to the demands of the health insurance community to describe various medical procedures and the provision of supplies. An operation will have a standardized code and a verbose name. Both are presented on the bill to the consumer. In an alternate embodiment, the bills which are read by the system are not changed in the least, but are presented to the customer or consumer as always. But, in that embodiment, the data which appears on the bills is obtained from the bills or the vendor at any point after the transactions reflected in the bills occur.

Thus, simultaneous with the presentation of the bill to the consumer, or at any point after the actual underlying transactions occur, the consumer's buying habits, as reflected by the bill, are compiled and entered in each of the three databases according to the nature of the data. The transaction is sent to the Customer Database to describe, further, the customer's buying habits. Each of these sales is anchored by the date of the transaction and because of the standardization of the definition of the transaction, a picture of the consumer as consumer begins to emerge. That picture is stored on the consumer's individual file in the Consumer Database 110.

The Vendor Database 120 contains associations that indicate the vendor's current offerings. So, for example, if a rate plan for long distance is considered, the software will attempt to match the plan to a known plan. If the plan is not found, a new definition of a plan is entered. Soon, the billing plans at the DPS should perfectly mimic those at the vendor.

The Transaction Database 130 is continually being refined by the offerings by various vendors. If, for example, the consumer purchased a newly offered package of cable channels, that package may not, at the time of purchase, be included in the Transaction Database 130. At either the vendor's notification or upon the DPS's failure to find an adequate definition for the good or service, the DPS institutes a new designation for the new service. In this manner, the database 130 is always up to date and comprehensive.

Figure 8:
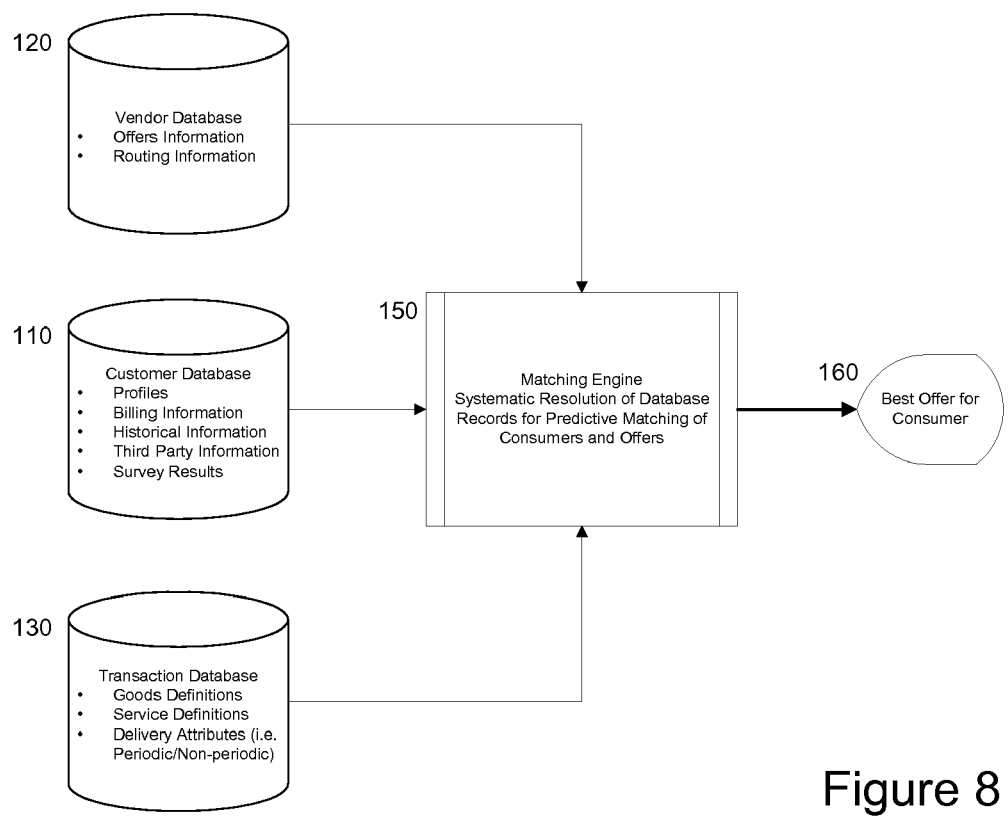
FIG. 8 illustrates an overall schematic of the database engine for producing best offers.

One principal advantage of the invention is to make the process of preparing and presenting offers to the customers efficient and tailored to the needs and desires of the customers in the database. That ability allows the vendors to forgo both marketing and advertising in the traditional sense. Rather, an offering is tailored to particular customers in the database and transmitted in a targeted presentation to those customers. By virtue of the customer's past buying habits, the offers can be presented in a side-by-side comparison. The resulting efficiencies should appear in the form of lower costs of sales, and, thus, lower prices to consumers. FIG. 8 illustrates the workings of this process. Importantly, these advantages are achieved without any additional effort on the consumer's part.

In FIG. 8, a vendor will place an offer in the Vendor Database 120 by communicating the same to the DPS. The event, placing the offer, will trigger the Matching Engine 150 to begin its process of, first, categorizing and normalizing the offer, much as described above for billings; second, assembling from the database a list of customers who currently, or who, by demographic study (as is further described in FIG. 10), are likely to purchase the product. For each such customer, the Matching Engine analyzes the offer in light of the customer's prior use of it or of a similar product or in light of need for such product demonstrated by demographics or the constellation of other purchases stored in the Customer Database 110. Such analysis will further narrow the likely customers for whom this offering is a "good deal." After the winnowing process, the DPS sends the "recommended" offer, along with reports of analysis as to annualized costs and comparative data, to the remaining designated customers. What the customer receives is likely a very attractive offer 160. This offer process is very likely to result in a sale without advertising or marketing to create the exposure of the offer to likely consumers. Again, the probability (that the offer will be accepted) is higher because the data, upon which the sorting analysis is based, is data from actual transactions of the targeted consumers. Thus, the vendor/offeror can objectively demonstrate an objective improvement over the consumers present expenditure.

Figure 9:
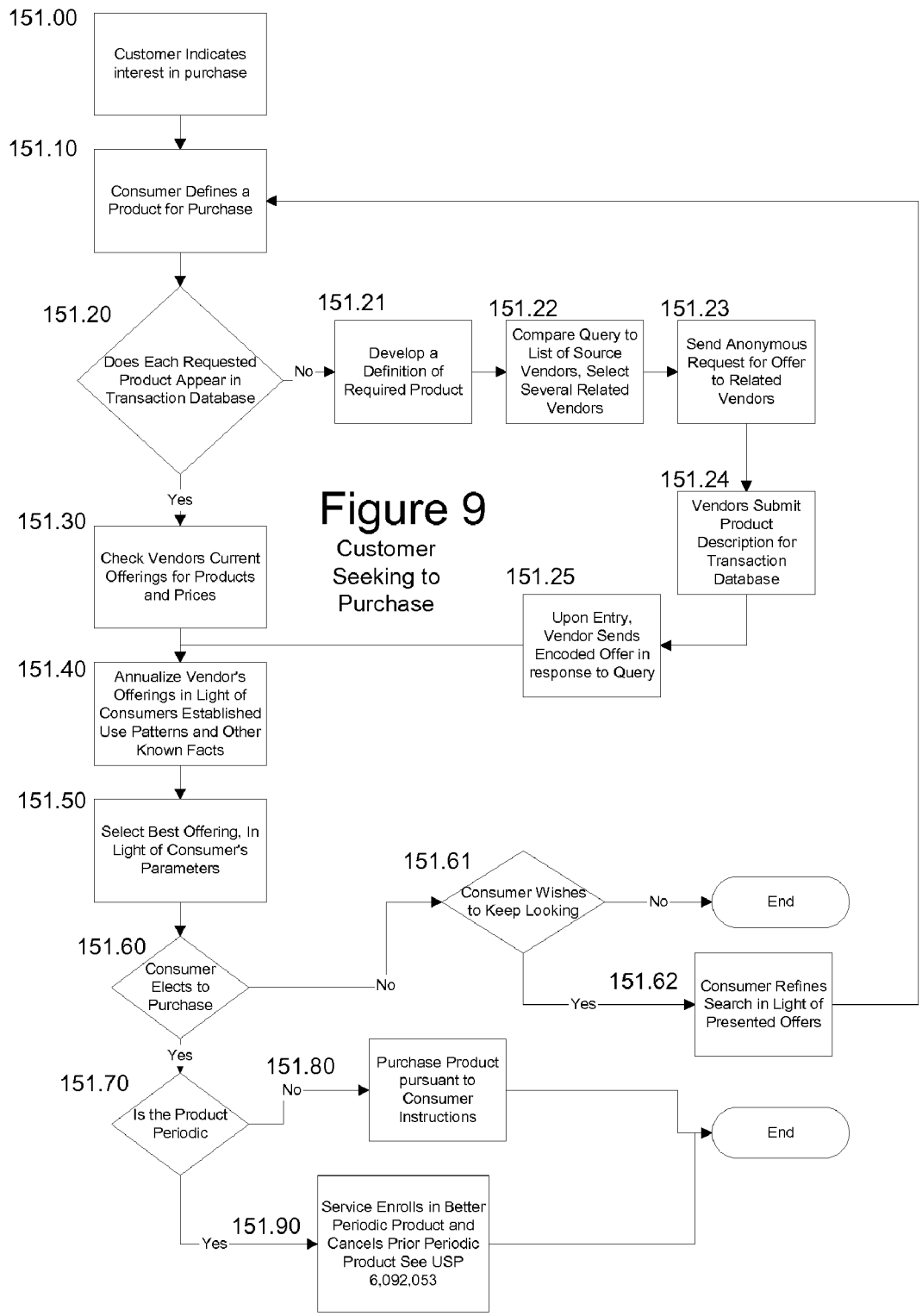
FIG. 9 illustrates the detailed flowchart of the process by which a customer "shops" for a product using the system.

The invention provides two-way matching. In the first application, the invention allows customer "shopping." In FIG. 9, the process for this "shopping" is set out. A customer signs on to a shopping screen, indicating his interest in making a purchase 151.00. In an interactive interview with the customer on the screen, the definition of the sought product is narrowed by questions and the customer's answers thereto 151.10. Once an operative definition of the sought product emerges, the DPS refers to its product definitions in the Transaction Database and checks for a match 151.20. If no such product exists in the database, an exact definition of the specifications sought by the customer is compiled from the product code 151.21. By virtue of the product definition, the DPS locates similar products 151.22. While these are, by Step 151.20, not complying products, the DPS presumes that the products cluster in the marketplace, i.e. that a vendor of similar products is the most likely vendor of the sought product. The DPS frames the request for offer in "verbose" language and transmits the same to vendor without identifying the customer 151.23. If the vendor does offer a complying product or wishes to compose a complying offer, they forward that offer to the DPS both as an offer in the database 151.23 and a specific notice to the DPS for forwarding to consumer with reference to the request 151.24.

In the event that the product does exist in the database, all such offers are collected 151.30. Whether in response to the customer request or whether it resided in the database, the several offers are compiled and annualized in light of the patterns established in the Customer Database 151.40. The offers are ranked with regard to such parameters as the customer has previously defined. In default of such parameters, the least expensive product over the annual cycle will be the leading offer. The DPS will present the several offers to the customer for purchase 151.60. If none of the offers interests the customer, the customer may choose 151.61 either to abandon the search or to redefine the parameters of the search 151.61, and begin again.

If one of the selected products interests the customer, in alternate embodiments of the invention, the DPS determines if the product is a periodic product, at step 151.70, such as insurance or telephones services, which is to say does the product actually represent a series of periodic purchases. Drawing on the information stored in the Customer database, the DPS will enroll the customer for purchase of the new periodic product, confirm the purchase and then cancel the customer's current product at Step 151.90. The process produces both efficient provision of product, i.e. no overlapping product, and complete coverage, i.e. no gap in coverage, especially for such products as insurance or heating oil. The process is facilitated by the information contained in the Customer Database (See FIG. 12). Alternatively, a procedure such as that described in Boesche, U.S. Pat. No. 6,092,053, can provide an alternate means of "automatic enrollment."

In the case of non-periodic product, the customer simply places an order 151.80. In either event, the system facilitates order placement for the customer as it does locating the conforming product.

Figure 10:
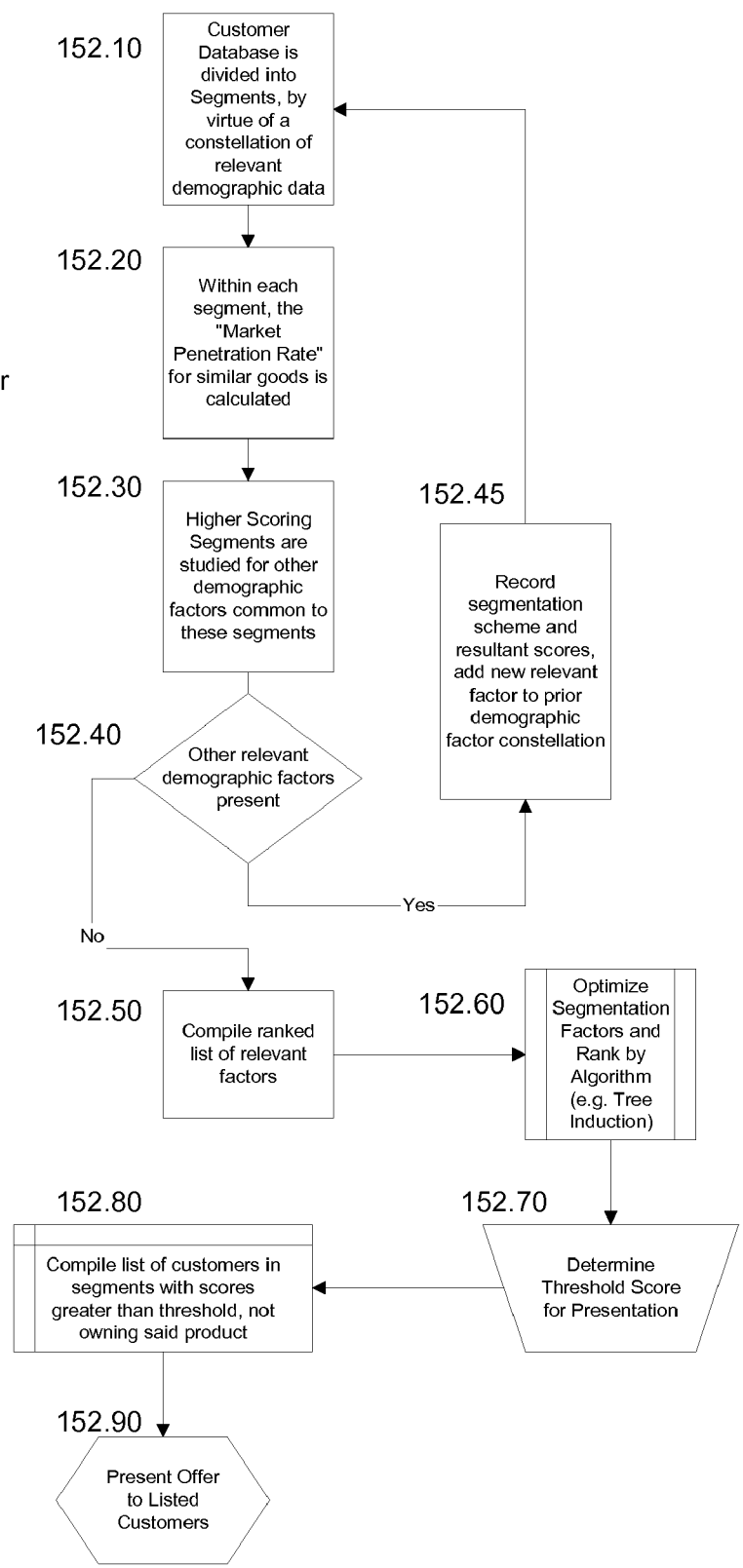
FIG. 10 illustrates the system's method for targeted marketing of an offer by a vendor.

In FIG. 10, the principal advantage to this "closed market" defined by the Customer Database, is the vendor's ability to tailor their offers of particular products to the demographics of this market. Because so much is known of the individual customers, the DPS can perform a statistical analysis and artificial intelligence to the process of market segmentation. Such segmentation study relates to the finding of potential customers for an optimized offer.

The object of this process is to break the market into segments 152.10 defined by specific demographic factors (e.g. age, sex, income) and/or by preferences revealed by transaction data. Once a market segment is defined, the product is tested for its appeal to that market segment 152.20. Strictly defined, that appeal is judged in terms of purchases recorded in the Customer Database of similar goods. The more similar the good, the higher the score. Other known statistical and analytical methods exist to refine this score. The inventive focus of this is invention is to garner the data and present it to the DPS for study by these known methods, but the statistical methods, themselves, are not claimed.

Once the segments are scored for market penetration, those segments that score highly are grouped and examined for demographic factors common to many segments 152.30. The study may be done in the negative as well, i.e. the factors common to the lowest scoring segments are determined to likely be absent from the optimally configured segments. In either regard, the grouping of segments according to score and demographics is used to discern factors that define likely customers to purchase the product in question.

Even in light of a principal factor, secondary factors may also be of interest. The study iterates until all factors of interest are defined 152.40. From the data thus collected, a list of factors should result and compiling the same in terms of rank is a known process 152.50. Segments of the market are then optimized for a particular offer 152.60. The DPS determines a threshold score below which the offer is deemed irrelevant to a particular customer. The relevant customers are listed and ranked 152.80. The offer is then formulated as in FIG. 9 as though the customer had been shopping for the same at Step 151.40, et seq. in Step 152.90.

Note that in some embodiments, the transaction or bill data can operate as the only source of data for market segmentation and offer optimization. In other words, no information extrinsic to the presented bills is necessary for the practice of the invention, and, in a certain sense, it is in this embodiment that the invention is the most powerful. For example, from a single bill and nothing more, the DPS can ascertain the consumer, the transaction, and the terms of the transaction. Even this information can be sufficient to populate the DPS databases, and provide the raw data necessary for the vendor, via the DPS, to segment a market and optimize offers. The reason for this is that extrinsic demographic information is fundamentally only an imperfect or crude proxy for the actual preferences and likely purchases of a consumer group, which can in many cases be more directly discerned with this invention.

For example, a high-end bicycle vendor wants to know who will buy a mountain bike costing over $900. The vendor wants to know that because the vendor only wants to offer such bikes to such persons. Traditionally, because the vendor doesn't know who such persons are, the vendor learns by survey for example, that 75% of such bikes are purchased by white, middle income males aged 25-45, so the vendor tries to target those persons, in the hope that some of them want to buy a bike in that price range. Thus, the demographic information (white, middle income etc.), is merely a means to an end, with no independent significance. The end is who will buy those $900 bikes. Aside from who will buy the bikes, the vendor doesn't really care about the traditional demographics. In contrast, this invention provides what in many cases will be a more meaningful means to the same end; actual purchases. For example, by using the invention, the vendor will have access to persons who have in fact purchased mountain bikes, or at least bikes (depending on the level of detail in the bills), costing over $900. The vendor would not necessarily know, or care, whether the person was white, or male, or old or young, or anything of the sort. All the vendor would really care to know was that the person purchased a bike in that price range. In many cases, past purchases is a more reliable indicator of future purchases than traditional demographic factors such as age, race, income, etc.

Note also, as mentioned above, that the invention is not restricted to analyzing a single variable, but can correlate multiple variables, regardless of whether extrinsic demographic data is available. Thus, for example, assume a vendor wants sell ski equipment. Traditionally, again, the vendor may target a certain demographic, which has demonstrated an imperfect, but at least positive correlation to ski equipment purchases. However, with the present invention, the vendor might be able to easily present offers to only those consumers who, in the past 3 years, have not only bought over $500 of ski equipment, but also either live in areas where it snows, or who have bought plane tickets to ski resorts, or who rent a ski chalet, or who are paying a mortgage on a cabin near a ski area. All of that information can be gleaned solely from the bills that are already being paid. Thus, again, merely from the bills and nothing else, substantially more accurate market segmentation and targeting can be accomplished, and at much lower cost. Of course, the invention can be practiced with any amount of additional extrinsic data, demographic or otherwise, but the point is that no extrinsic data is necessary. In a sense, as far as vendors are concerned, consumers are primarily defined by where, when and how they spend their money. Methods of simple or complex artificial intelligence can be applied to further analyze the spending patterns of particular consumers, and so draw increasingly useful inferences. For example, it may be possible to deduce from a customer's health care expenses that they have recently had a new child. New children typically trigger a reasonably predictable chain of expenses for years after. This in itself is useful market intelligence. However, that information can be correlated against several other kinds of expenses discerned from the bills to develop extremely precise market segmentation and optimally targeted offers.

Figure 11:
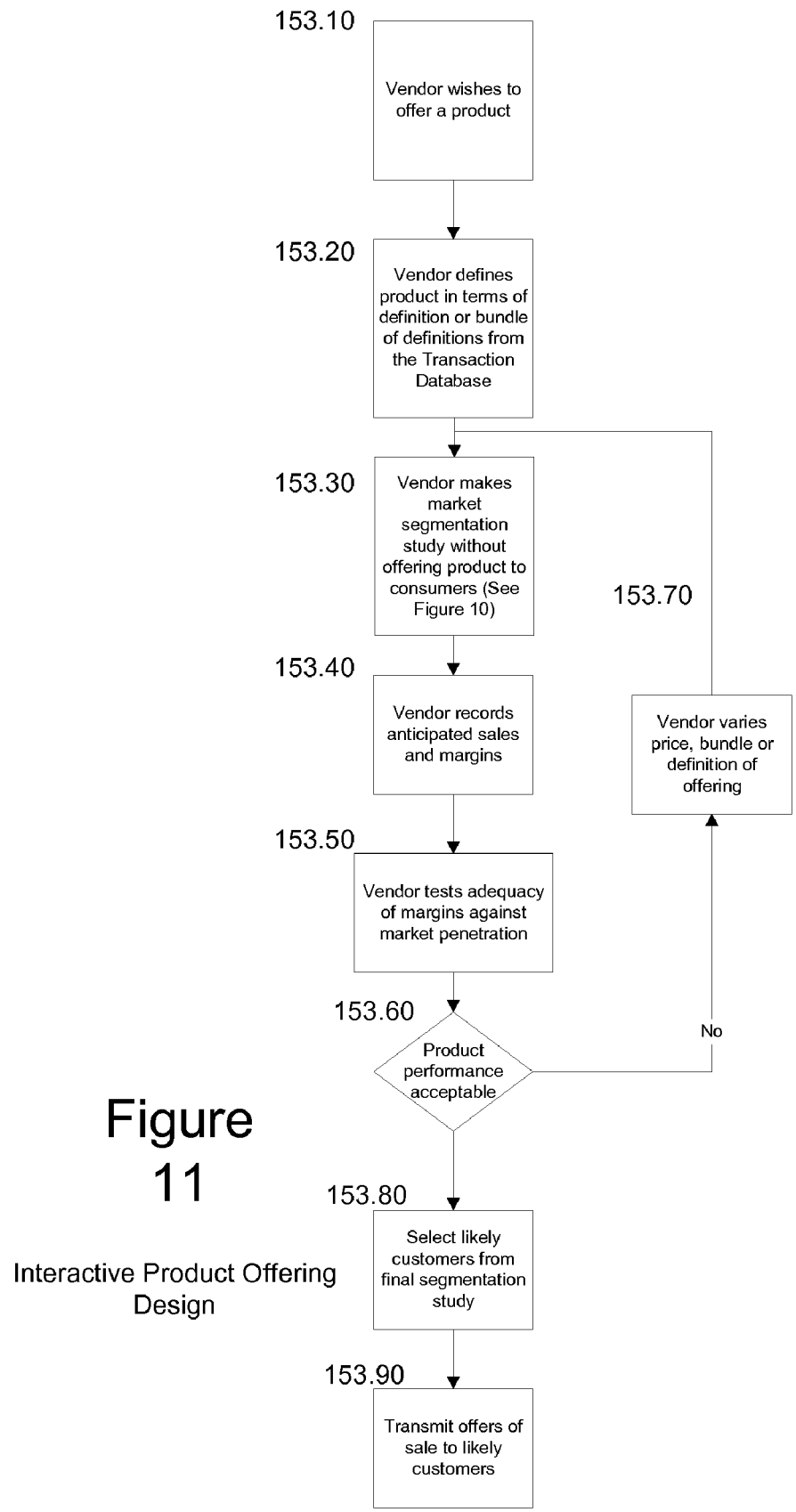
FIG. 11 illustrates the system's method of optimizing a vendor's offer in light of market segmentation study; and, FIG. 12 illustrates the consumer's method of automatically starting and canceling periodic products for efficient and seamless coverage.

An additional refinement of the process is portrayed in FIG. 11. As in FIG. 10 the vendor conceives of a product for offering 153.10. Similarly, as well, the vendor must described that offer with terms defined in the Transaction Database 153.20. In Step 153.30, the vendor replicates the steps 152.10 through 152.80. When completed, rather than to immediately offer the product to the customers, the DPS then, with the predicted market penetration "costs out" the offer 153.40. Presuming the predicted sales, standard methods of delivery and other relevant contingencies, the vendor projects all of the costs of making the offer. Due to the efficiency of the "closed market" the vendor may find otherwise hidden economies, such as those of scale or production for a set run of product 153.50. Indeed, based upon those projections, the vendor can realize particular specificity in its contracts with third party suppliers that may, itself, create economies in the offering.

Realizing these efficiencies, the vendor may choose 153.60 to present the offer as then currently constructed or, in search of greater market share, modify the offer to reflect these economies and test the newly reconstructed offer 153.70. In either regard, after iteration, the offer is deemed optimized. Based upon the segmentation data gathered at Step 153.30, the DPS selects likely purchasers from the Customer Database 110 at Step 153.80. As in Step 152.90, the DPS presents the offer to likely customers 153.90.

Figure 12:
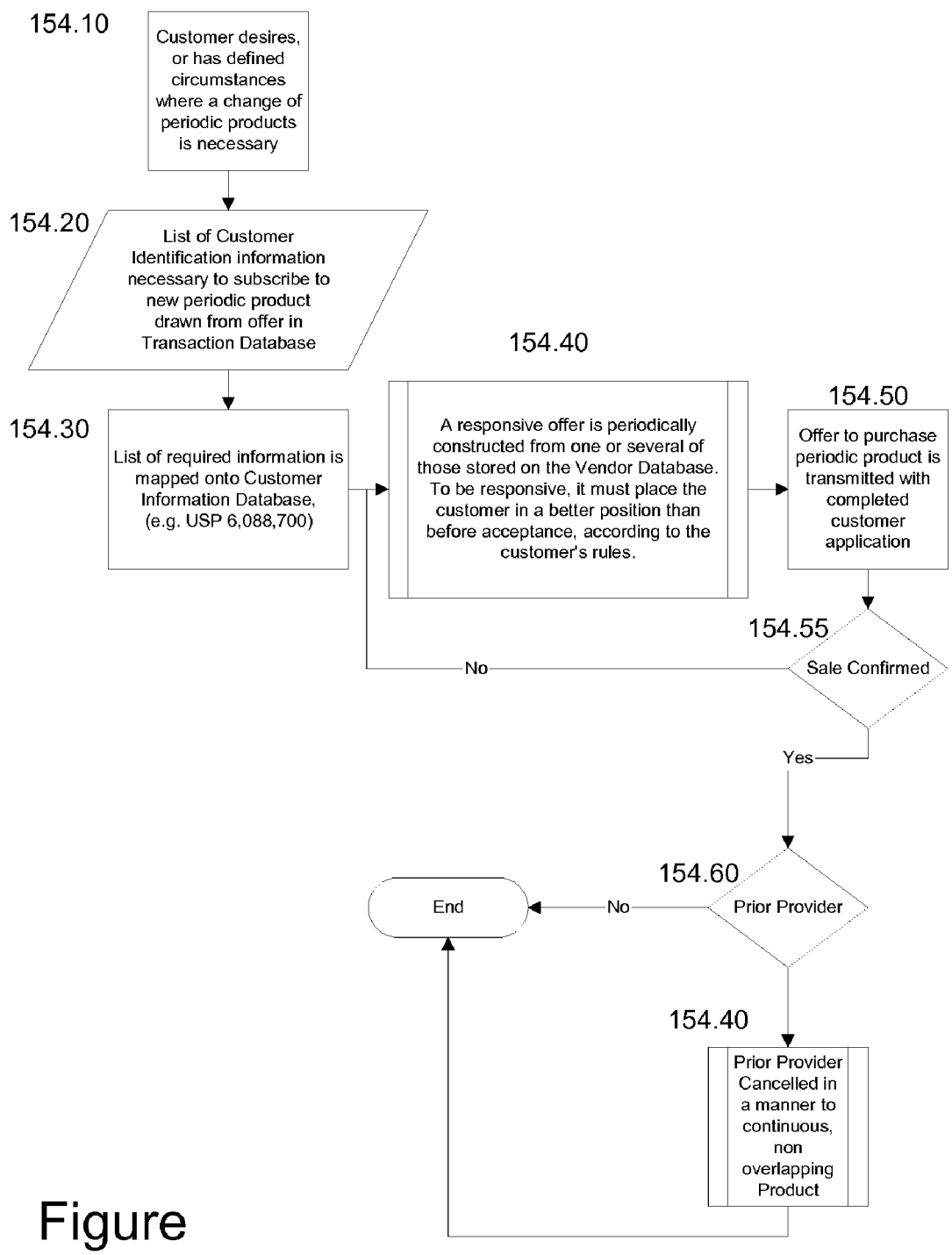

FIG. 12, describes a two-sided process between the customer and DPS to optimize the purchase of certain periodic products. In such a scenario, the customer indicates the preference for automated purchase of a particular product. Through an interactive interview process, the customer's needs are ascertained, then coupled with the customer's own prior use patterns, a qualifying offer is defined and mapped onto the Customer Database 110 under the customer's identity 154.30. Along with the definition are stored the customer's authorization to and rules for purchase of the periodic product.

At Step 154.40 the Matching Engine 150 constructs bundles of services from the Transaction Database 130 and test them for pricing in the Vendor Database 120. The resulting bundles are rated for compliance with the customer's rules and if better than the customer's current periodic product offer, the Matching Engine sends an order to the vendors of the optimal bundle 154.50. Once confirmed 154.55, the prior purchasing, if any 154.60, is cancelled 154.70. The result should be optimal coverage. Once the rules are defined at Step 154.20, the purchase take place entirely in the background with reports to the customer only upon request or upon change of vendors. Thus, the customer receives optimal pricing for coverage of periodic needs, without the requirement of price shopping.

As this period product purchasing occurs, the vendor's own optimizing of offers should result in significant and regular changes in service in order to capture the best prices. Likewise, the sellers gain greater exposure for products without the otherwise required "front-end" advertising and marketing. Efficiencies realized by means of this invention should be mutually beneficial to vendors and customers.

While the preferred embodiment of the invention has been illustrated and described, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for facilitating electronic commerce between a multiplicity of customers and a multiplicity of vendors, comprising:
   a. creating a customer database, comprising:
      i. enrolling a multiplicity of customers into a closed market;
      ii. inputting a unique variable identifier to each customer of the multiplicity of customers; and,
      iii. creating an initial record containing identity and demographic information for said each customer of the multiplicity of customers;
   b. creating a transaction database, comprising:
      i. creating a record corresponding to each product of a multiplicity of products;
      ii. identifying a sales unit quantity appropriate to the product;
      iii. inputting a unique variable identifier to the product; and
      iv. sorting and categorizing the products according to categories comprising function, use and composition;
   c. creating a vendor database, comprising:
      i. creating a record corresponding to each vendor of a multiplicity of vendors;
      ii. inputting a unique variable identifier to said each vendor of the multiplicity of vendors;
   d. recording all purchases; comprising:
      i. identifying each customer who effected purchase of the purchases being recorded by each customer's unique variable identifier stored in the customer database;
      ii. identifying the vendor, from the vendor database, from whom the customer effected the purchase by the vendor's unique variable identifier;
      iii. splitting each purchase into component line items;
      iv. determining the number of sales units purchased in each component line item;
      v. identifying each component line item by said component line item's unique variable identifier inputted in the transaction database;
      vi. identifying a date for each purchase; and,
      vii. inputting a relational instance in the customer database, comprising:
         (A) the customer's unique variable identifier;
         (B) the line item's unique variable identifier, stored in the transaction database;
         (C) multiple of sales units;
         (D) the vendor's unique variable identifier, stored in the vendor database; and, (E) the date of purchase;
   e. receiving a vendor's offer to sell a product to the multiplicity of customers;
   f. sorting the demographic data and purchase history for each customer and, in turn, sorting the multiplicity of the customers by a multiplicity of segments, each segment representing a group of one or more demographic characteristics or purchases;
   g. calculating a statistical score representing market penetration of the vendor's offer for each segment of the multiplicity of segments based upon demographic characteristics and the purchase history;
   h. sorting the multiplicity of segments by statistical score,
   i. selecting a threshold score for likely customer acceptance of the vendor's offer; and,
   j. communicating the vendor's offer to the customers with the statistical score greater than the threshold score.

2. The method for facilitating commerce in claim 1, further comprising the steps of:
   i. selecting a threshold score for likely customer acceptance of the vendor's offer;
   j. calculating profit the vendor is likely to realize;
   k. calculating the number of units sold the vendor is likely to realize by communicating the vendor's offer to customers with a statistical score greater than threshold score;
   l. calculating market share the vendor is likely to realize by communicating the vendor's offer to customers with a statistical score greater than threshold score.

3. The method for facilitating commerce in claim 2, further comprising the steps of:
   m. selecting values reflecting acceptable profit, acceptable number of units sold and acceptable market share the vendor will realize from the vendor's offer;
   n. adjusting terms of the vendor's offer in light of the profit, number of units sold, and market share;
   o. repeating steps e through h, and k through n until the profit, number of units sold and the market share most closely meet the selected values.

* * * * *